(12) United States Patent
Chae et al.

(10) Patent No.: US 11,455,529 B2
(45) Date of Patent: Sep. 27, 2022

(54) ARTIFICIAL INTELLIGENCE SERVER FOR CONTROLLING A PLURALITY OF ROBOTS BASED ON GUIDANCE URGENCY

(71) Applicant: LG ELECTRONICS INC., Seoul (KR)

(72) Inventors: Jonghoon Chae, Seoul (KR); Jisoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 598 days.

(21) Appl. No.: 16/557,834

(22) Filed: Aug. 30, 2019

(65) Prior Publication Data
US 2020/0005144 A1    Jan. 2, 2020

(30) Foreign Application Priority Data
Jul. 30, 2019    (KR) .......................... 10-2019-0092614

(51) Int. Cl.
*G05B 19/4155*    (2006.01)
*G06N 3/08*    (2006.01)

(52) U.S. Cl.
CPC ............ *G06N 3/08* (2013.01); *G05B 19/4155* (2013.01); *G05B 2219/32335* (2013.01); *G05B 2219/50391* (2013.01)

(58) Field of Classification Search
None
See application file for complete search history.

(56) References Cited

U.S. PATENT DOCUMENTS

| 2017/0132475 A1* | 5/2017 | Oami | H04N 7/181 |
| 2018/0108352 A1* | 4/2018 | Sumiyoshi | G06N 3/008 |
| 2022/0066438 A1* | 3/2022 | Higashi | G06Q 50/00 |

FOREIGN PATENT DOCUMENTS

| JP | 2008132568 | 6/2008 |
| KR | 1020180054505 | 5/2018 |

OTHER PUBLICATIONS

Alitappeh et al. 'Multi-objective multi-robot deployment in a dynamic environment' Soft Comput (2017) 21:6481-6497.*
Yi, English translation of Chinese Patent Document CN 107103388 published Aug. 29, 2017.*
Korean Intellectual Property Office Application No. 10-2019-0092614, Office Action dated Sep. 21, 2020, 6 pages.

* cited by examiner

*Primary Examiner* — Bernard G Lindsay
(74) *Attorney, Agent, or Firm* — Lee, Hong, Degerman, Kang & Waimey PC

(57) ABSTRACT

An artificial intelligence server for controlling a plurality of robots using artificial intelligence includes a communication unit configured to receive a captured image of each of a plurality of zones and a processor configured to acquire situation information of each zone based on the received image, acquire degrees of guidance urgency respectively corresponding to the plurality of zones based on the acquired situation information of each zone, determine whether there is a degree of guidance urgency greater than a predetermined value in the acquired degrees of guidance urgency, and, when there is a degree of guidance urgency greater than the predetermined value, transmit a first control command for moving one or more robots to a zone corresponding to the degree of guidance urgency.

8 Claims, 12 Drawing Sheets

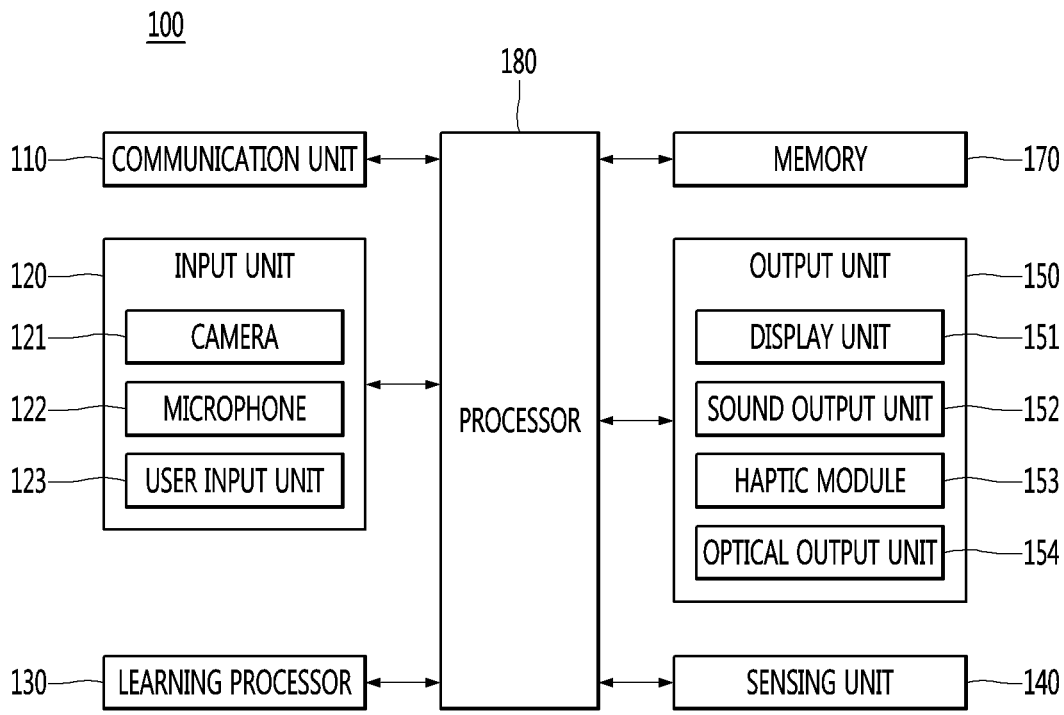
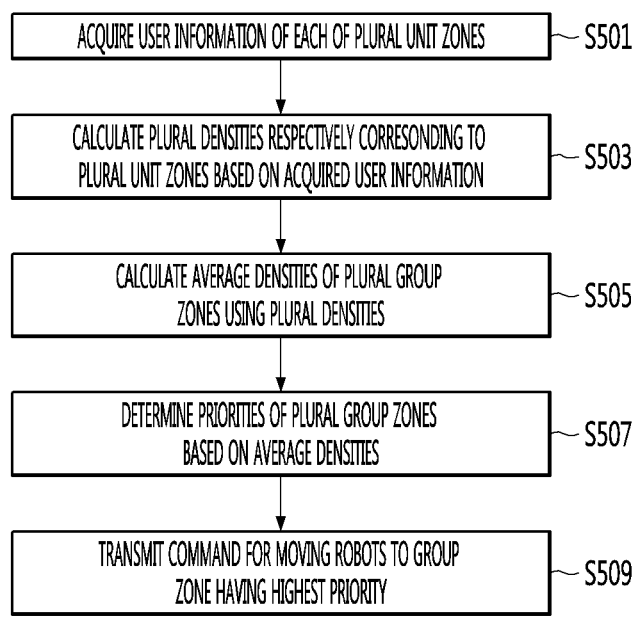

| ZONE | DENSITY | NUMBER OF WAITING PERSONS | DEGREE OF GUIDANCE URGENCY |
|---|---|---|---|
| 1 | 5 | 0 | 5(1*5+4*0) |
| 2 | 3 | 2 | 11(1*3+4*2) |
| 3 | 1 | 1 | 5(1*1+4*1) |
| 4 | 2 | 0 | 2(2*1+4*0) |

ARTIFICIAL INTELLIGENCE SERVER FOR CONTROLLING A PLURALITY OF ROBOTS BASED ON GUIDANCE URGENCY

CROSS-REFERENCE TO RELATED APPLICATIONS

Pursuant to 35 U.S.C. § 119(a), this application claims the benefit of earlier filing date and right of priority to Korean Patent Application No. 10-2019-0092614, filed on Jul. 30, 2019, the contents of which are hereby incorporated by reference herein in its entirety.

BACKGROUND

The present invention relates to an artificial intelligence server for controlling a plurality of robots using artificial intelligence.

Recently, with explosive increase in number of passengers who use airports and efforts to leap into smart airports, methods of providing services using robots in airports or multiplexes have been discussed.

When intelligent robots are introduced into airports or multiplexes, it is expected that the robots can perform the unique roles of people which cannot be replaced with conventional computer systems, thereby achieving quantitative and qualitative improvement of the provided services.

One of the most important functions of the robots in places where many people gather, including the airports, is to provide users with information such as guidance information.

However, generally, since a robot is located only in a zone allocated thereto, it may be difficult to actively cope with a situation in which people are densely crowded and the guidance services of more robots are necessary.

In addition, as a robot leaves a zone allocated thereto and wanders, a proper guidance service may not be provided in the zone.

SUMMARY

An object of the present invention is to move a robot in consideration of the surrounding situation of a complex space.

Another object of the present invention is to provide an artificial intelligence server capable of controlling movement of a robot in consideration of the situation of each zone.

Another object of the present invention is to efficiently maintain arrangement of robots in consideration of reception sensitivity.

The artificial intelligence device according to an embodiment of the present invention may include a processor for determining a zone having a largest degree of guidance urgency based on situation information of each zone and transmitting a first control command for moving one or more robots disposed in other zones to the determined zone.

The artificial intelligence device according to an embodiment of the present invention can acquire the situation information of each zone using an image recognition model.

BRIEF DESCRIPTION OF THE DRAWINGS

FIG. 4 is a diagram showing an AI device according to another embodiment of the present invention.

FIG. 5 is a flowchart illustrating a method of operating an AI server for providing a guidance service according to an embodiment of the present invention.

FIG. 6 is a view showing density calculated in a unit zone according to an embodiment of the present invention.

DETAILED DESCRIPTION OF THE EMBODIMENTS

<Artificial Intelligence (AI)>

Figure 1:
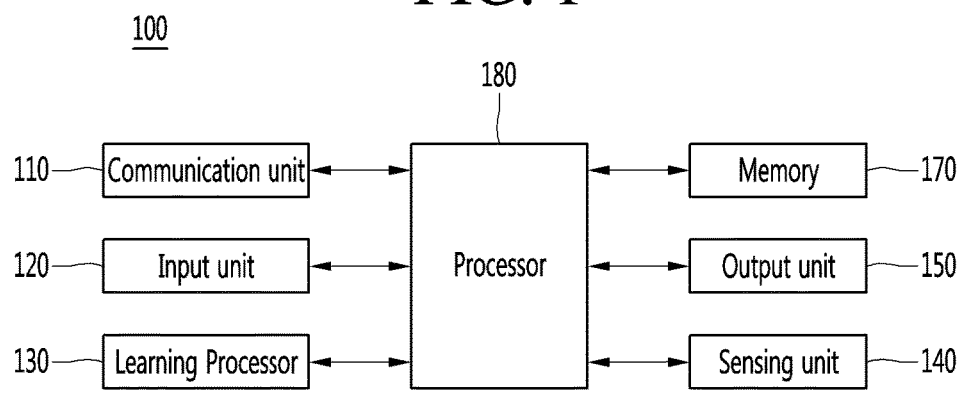
FIG. 1 is a diagram showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
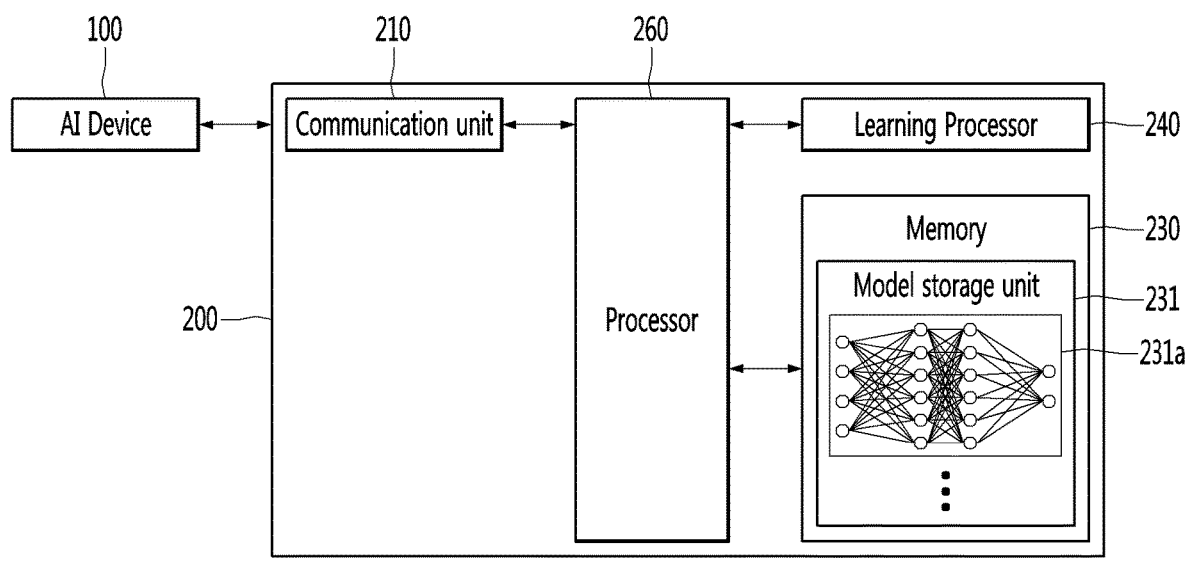
FIG. 2 is a diagram showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
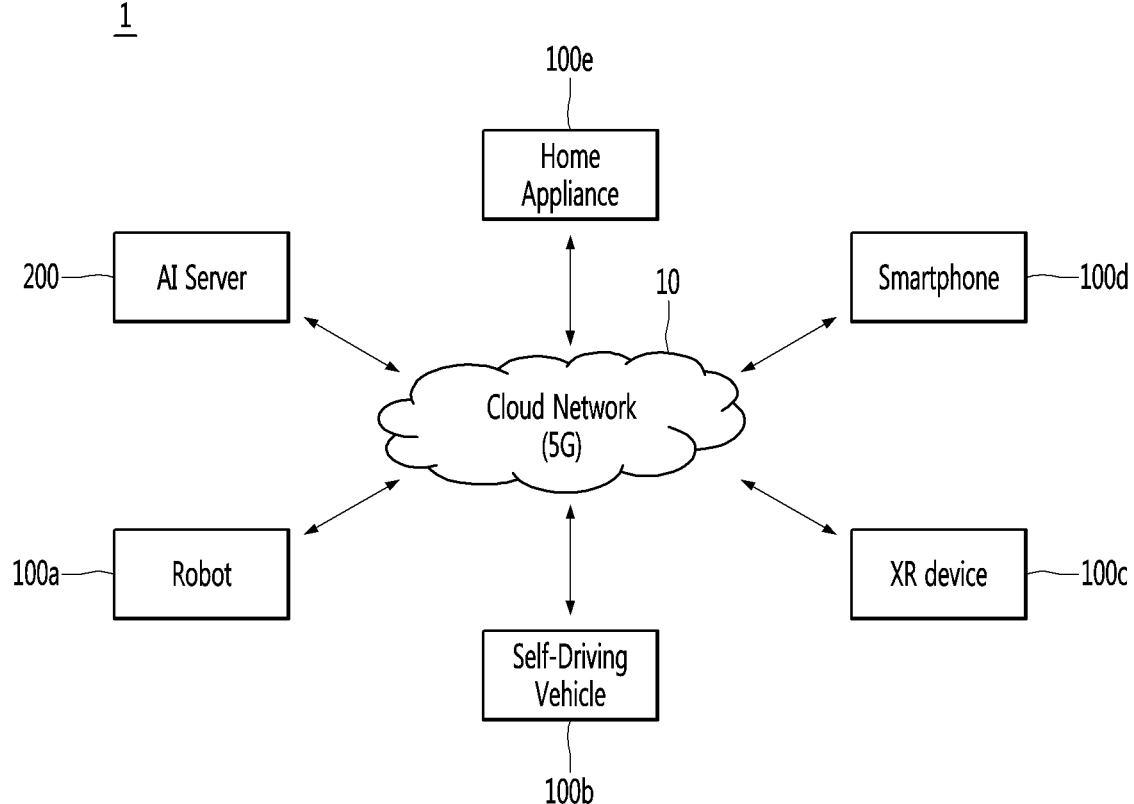
FIG. 3 is a diagram showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects disposed in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

FIG. 5 is a flowchart illustrating a method of operating an AI server for providing a guidance service according to an embodiment of the present invention.

The AI server 200 may be a control system for controlling a plurality of robots disposed in an airport or a building.

The processor 260 of the AI server 200 acquires user information of each of a plurality of unit zones through the communication unit 210 (S501).

In one embodiment, the plurality of unit zones may configure an entire zone in which the plurality of robots for providing guidance services is disposed.

Each of the plurality of unit zones may have a rectangular shape, but this is merely an example. The areas of the unit zones may be equal to each other.

The memory 230 of the AI server 200 may store position information indicating the respective positions of the plurality of unit zones. The position information may be coordinates of the unit zone.

The processor 260 may receive user information corresponding to each unit zone from the plurality of robots through the communication unit 210. The user information corresponding to each unit zone may include an image of each unit zone and voice data uttered by users and collected in each unit zone.

The processor 260 may receive, from a robot disposed in each unit zone, an image of the unit zone and voice data collected in the unit zone.

Each of the plurality of robots may capture the image of the unit zone in which each robot is located and transmit the captured image of the unit zone to the AI server 200.

Each of the plurality of robots may receive voice uttered by a user in the unit zone in which each robot is located using a microphone and transmit voice data corresponding to the received voice to the AI server 200.

In another example, the processor 260 may receive the captured image of the unit zone from a camera installed in each unit zone and receive voice data collected in the unit zone from a microphone installed in each unit zone.

The processor 260 may extract the face of the user included in the image using the image of each unit zone. The processor 260 may acquire the number of users corresponding to the number of extracted user's faces.

The processor 260 may extract the face of the user from the image using an image recognition model.

The image recognition model may be an artificial neural network based model learned through a deep learning algorithm or a machine learning algorithm.

The image recognition model may be learned through supervised learning. For learning, used learning data may include image data and labeling data labeled with the image data. The labeling data may be correct answer data indicating the user's face.

The image recognition model may be a model for inferring presence of the user's face from the image data.

The processor 260 may extract a plurality of frequency bands from the voice data of each unit zone and acquire the plurality of extracted frequency bands as the number of users.

The acquired number of users present in each unit zone may be used as a density indicating a degree of density of each unit zone.

The processor 260 of the AI server 200 calculates a plurality of densities respectively corresponding to the plurality of unit zones based on the acquired user information (S503).

The processor 260 may acquire the number of users present in each unit zone as the density of the unit zone. For example, when the number of users present in one unit zone is 8, the density of the unit zone may be calculated as 8.

This will be described with reference to FIG. 6.

FIG. 6 is a view showing density calculated in a unit zone according to an embodiment of the present invention.

Referring to FIG. 6, an entire zone 600 having a square shape is shown.

The entire zone 600 includes a plurality of unit zones.

Each unit zone 601 may have a square shape. In FIG. 6, the entire zone 600 may be expressed by 5×5 zones. The entire zone 600 may include 25 unit zones.

The density calculated based on user information is described in each unit zone 601.

For example, the densities <1, 3, 0, 2, 5> calculated in unit zones are described in the first row of the entire zone 600.

The memory 230 may store the position information indicating the position of each unit zone 601. The processor 260 may acquire the coordinates of each unit zone using a position measurement module such as a GPS module.

The position information of each unit zone 601 may be the coordinates of the center of the unit zone.

FIG. 5 will be described again.

The processor 260 of the AI server 200 calculates average densities of a plurality of group zones using the plurality of calculated densities (S505).

The processor 260 may divide the entire zone 600 into a plurality of group zones and calculate average densities based on the densities of the unit zones included in each group zone.

Each group zone may have 4×4, 3×3 or 2×2 zones having a square shape.

The processor 260 of the AI server 200 determines priority of each of the plurality of group zones based on the average densities (S507).

The processor 260 may give higher priority to a group zone having a larger average density.

The priority may be a rank determined to preferentially move robots to a corresponding group zone.

This will be described with reference to FIGS. 7 to 9.

Figure 7:
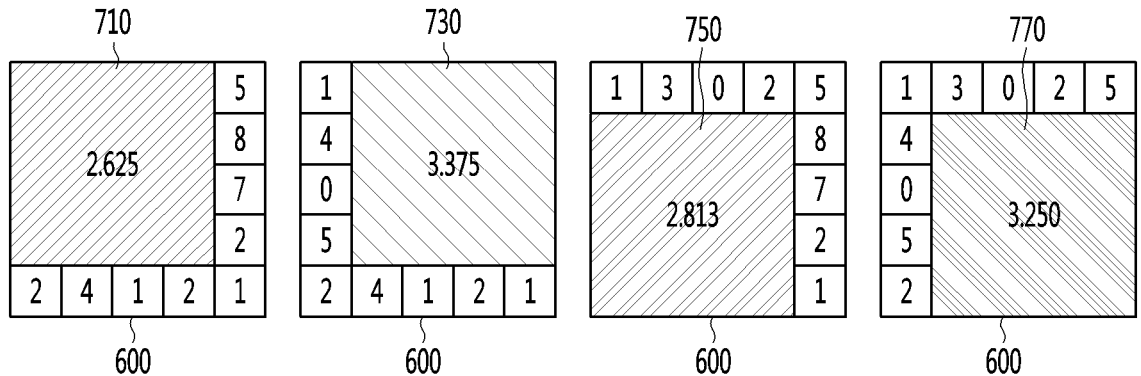
FIGS. 7 to 9 are views illustrating a process of dividing an entire zone into a plurality of unit group zones and calculating an average density of each unit group zone.
Figure 8:
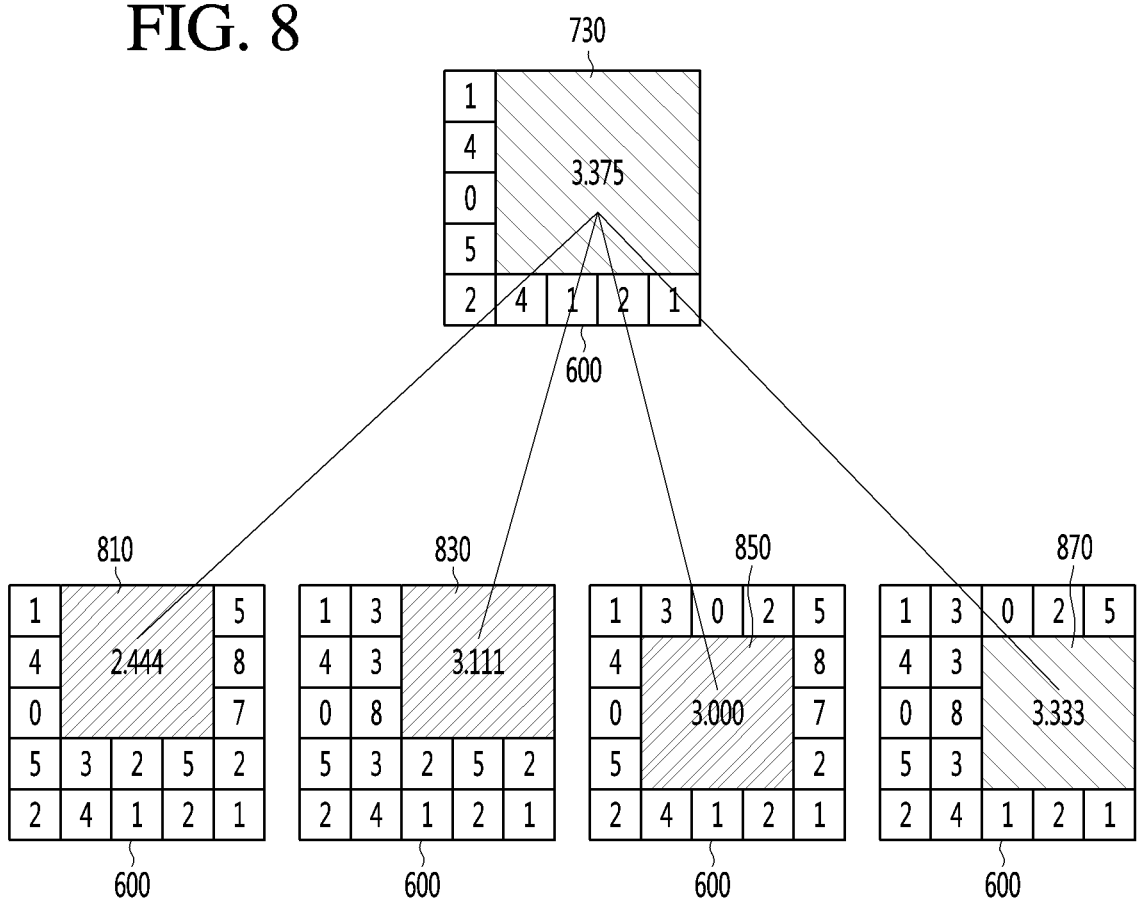
Figure 9:
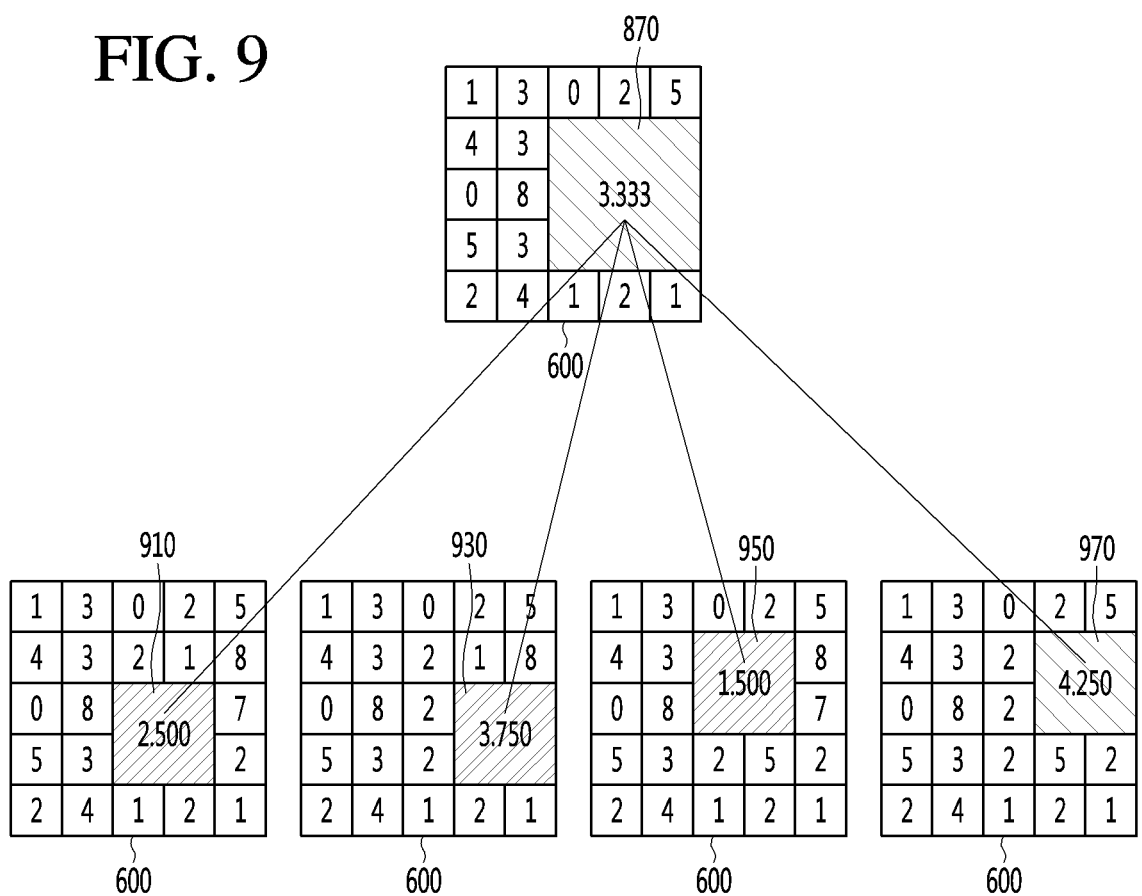

FIGS. 7 to 9 are views illustrating a process of dividing an entire zone into a plurality of unit group zones and calculating an average density of each unit group zone.

First, FIG. 7 will be described.

Referring to FIG. 7, a result of dividing a 5×5 type entire zone 600 into 4×4 type unit group zones and calculating the average density of each unit group zone is shown.

That is, the entire zone 600 may be divided into four unit group zones 710 to 770.

The memory 230 may store the position information indicating the position of each unit group zone. The position information of each unit group zone may be the coordinates of the center of each unit group zone.

Each unit group zone may include 4×4 unit zones, that is, 16 unit zones.

The average density of the first unit group zone 710 may be an average value of the densities respectively calculated in the plurality of unit zones included in the first unit group zone 710.

That is, the average density of the first unit group zone 710 may be calculated as (1+3+0+2+4+3+2+1+0+8+2+1+5+3+2+5)/16=2.625.

The average density of the second unit group zone 730 may be an average value of the densities respectively calculated in the plurality of unit zones included in the second unit group zone 730.

In the same manner, the average density of the second unit group zone 730 may be calculated as 3.375.

The average density of the third unit group zone 750 may be an average value of the densities respectively calculated in the plurality of unit zones included in the third unit group zone 750.

The average density of the third unit group zone 750 may be calculated as 2.813.

The average density of the fourth unit group zone 770 may be an average value of the densities respectively calculated in the plurality of unit zones included in the fourth unit group zone 770.

The average density of the fourth unit group zone 770 may be calculated as 3.250.

The processor 260 may determine priority for preferentially moving the robots based on the average densities of the first to fourth unit group zones 710 to 770.

The processor 260 may give higher priority to a unit group having a larger average density.

That is, the second unit group zone 730 may be ranked first, the fourth unit group 770 may be ranked second, the third unit group zone 750 may be ranked third and the first unit group zone 710 may be ranked fourth.

The processor 260 may give highest priority to the second unit group zone 730 having largest average density among the first to fourth unit group zones 710 to 770.

The processor 260 may transmit, to one or more robots, a command for moving one or more robots to the second unit group zone 730 having highest priority.

To this end, the processor 260 may also transmit the position information of each unit group to one or more robots.

The position information of each unit group zone may be prestored in the memory 230.

In another example, the processor 260 may subdivide the second unit group zone 730 to calculate average density. This will be described with reference to FIG. 8.

Referring to FIG. 8, the second unit group zone 730 may be divided into a plurality of lower unit group zones 810 to 870.

Each of the plurality of lower unit group zones 810 to 870 may have 3×3 unit zones.

Each lower unit group zone may include 9 unit zones.

The memory 230 may store the position information of each lower unit group zone. The position information of each lower unit group zone may be the coordinates of the center of each lower unit group zone.

The processor 260 may calculate the average density of each of the plurality of lower unit group zones 810 to 870 configuring the second unit group zone 730, in order to identify a denser zone within the second unit group zone 730.

The average density of the first lower unit group zone 810 may be an average value of the densities respectively calculated in the plurality of unit zones included in the first lower unit group zone 810.

The average density of the first lower unit group zone 810 may be calculated as (3+0+2+3+2+1+8+2+1)/9=2.444.

The average density of the second lower unit group zone 830 may be an average value of the densities respectively calculated in the plurality of unit zones included in the second lower unit group zone 830.

In the same manner, the average density of the second lower unit group zone 830 may be calculated as 3.111.

The average density of the third lower unit group zone 850 may be an average value of the densities respectively calculated in the plurality of unit zones included in the third lower unit group zone 850.

The average density of the third lower unit group zone 850 may be calculated as 3.0.

The average density of the fourth lower unit group zone 870 may be an average value of the densities respectively calculated in the plurality of unit zones included in the fourth lower unit group zone 870.

The average density of the fourth lower unit group zone 870 may be calculated as 3.333.

The processor 260 may determine priority for preferential moving robots based on the average densities of the first to fourth lower unit group zones 810 to 870.

The processor 260 may give higher priority to a lower unit group zone having a larger average density.

That is, the fourth lower unit group zone 870 may be ranked first, the second lower unit group zone 830 may be ranked second, the third lower unit group zone 850 may be ranked third, and the first lower unit group zone 810 may be ranked fourth.

The processor 260 may give highest priority to the fourth lower unit group zone 870 having largest average density.

The processor 260 may transmit, to one or more robots, a command for moving one or more robots to the fourth lower unit group zone 870. The command may also include the position information of the fourth lower unit group zone 870.

The processor 260 may subdivide the fourth lower unit group zone 870 to calculate average density. This will be described with reference to FIG. 9.

Referring to FIG. 9, the fourth lower unit group zone 870 may be divided into a plurality of lowermost group zones 910 to 970.

Each of the plurality of lowermost unit group zones 910 to 970 may have 2×2 unit zones.

Each lowermost unit group zone may include four unit zones.

The memory 230 may store the position information of each lowermost unit group zone. The position information of each lowermost unit group zone may be the coordinates of the center of each lowermost unit group zone.

The processor 260 may calculate the average density of each of the plurality of lowermost unit group zones 910 to 970, in order to identify a denser zone within the fourth lower unit group zone 870.

The average density of the first lowermost unit group zones 910 may be an average value of the respective densities of the plurality of unit zones included in the first lowermost unit group zones 910.

The average density of the first lowermost unit group zones 910 may be calculated as (2+1+2+5)/4=2.5.

The average density of the second lowermost unit group zones 930 may be an average value of the respective densities of the plurality of unit zones included in the second lowermost unit group zones 930.

The average density of the second lowermost unit group zones 930 may be calculated as 3.75.

The average density of the third lowermost unit group zones 950 may be an average value of the respective densities of the plurality of unit zones included in the third lowermost unit group zones 950.

The average density of the third lowermost unit group zones 950 may be calculated as 1.5.

The average density of the fourth lowermost unit group zones 970 may be an average value of the respective densities of the plurality of unit zones included in the fourth lowermost unit group zones 970.

The average density of the fourth lowermost unit group zones 970 may be calculated as 4.25.

The processor 260 may give higher priority to a lowermost unit group zone having a larger average density.

That is, the fourth lowermost unit group zones 970 may be ranked first, the second lowermost unit group zones 930 may be ranked second, the first lowermost unit group zones 910 may be ranked third, and the third lowermost unit group zones 950 may be ranked fourth.

The processor 260 may determine the fourth lowermost unit group zone 970 having largest average density as a zone in which guidance for the users is urgently needed.

According to the embodiment of the present invention, a zone, in which users are densely crowded, of the entire zone 600 may be subdivided, thereby immediately reacting with a situation requiring guidance.

Therefore, the robots may move to a zone in which the users are densely crowded, thereby immediately providing desired guidance services to the users.

FIG. 5 will be described again.

The processor 260 of the AI server 200 transmits, to one or more robots, a command for moving one or more robots to a group zone having highest priority through the communication unit 210 (S509).

The processor 260 may transmit, to one or more robots, a command for moving one or more robots to a zone having highest priority among the plurality of unit group zones.

The processor 260 may transmit, to one or more robots, a command for moving one or more robot to a zone having highest priority among the plurality of lower unit group zones.

The processor 260 may transmit, to one or more robots, a command for moving one or more robot to a zone having highest priority among the plurality of lowermost unit group zones.

Here, one or more robots may be idle robots, the task of which has been completed.

Meanwhile, the processor 260 may set the paths of one or more robots to be moved according to priority.

FIG. 7 will be described.

The processor 260 may transmit, to one or more robots, a command for moving one or more robots in order of the second unit group zone 730, the fourth unit group zone 770, the third unit group zone 750 and the first unit group zone 710.

Next, a process of determining priority when the average densities of the group zones are the same.

Figure 10:
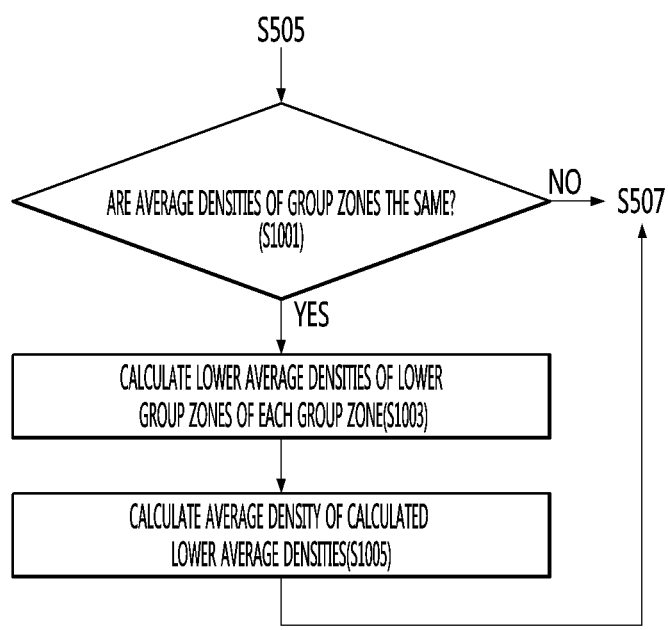
FIG. 10 is a flowchart illustrating a method of determining priority of each group zone when the average densities of group zones are the same according to an embodiment of the present invention.

FIG. 10 is a flowchart illustrating a method of determining priority of each group zone when the average densities of group zones are the same according to an embodiment of the present invention.

Referring to FIG. 10, the processor 260 of the AI server 200 determines whether the average densities of the group zones are the same after step S505 (S1001).

When the average densities of the group zones are the same, the processor 260 calculates the lower average densities of the lower group zones of each group zone (S1003).

The processor 260 calculates the average density of the calculated lower average densities of each group zone (S1005).

Thereafter, the processor 260 determines the priority of the group zone based on the calculated average density (S507).

The embodiment of FIG. 10 will be described with reference to FIG. 11.

Figure 11:
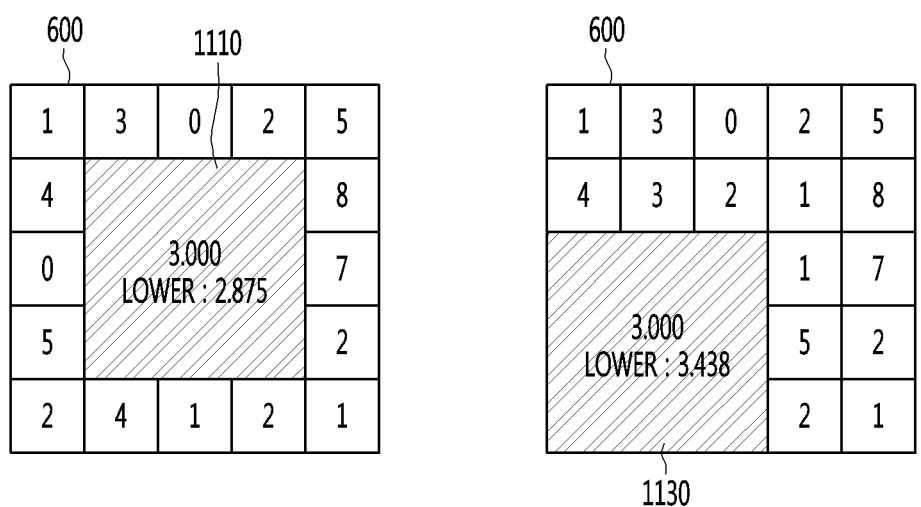
FIG. 11 is a view showing an actual example of determining priority when the average densities of group zones are the same according to an embodiment of the present invention.

FIG. 11 is a view showing an actual example of determining priority when the average densities of group zones are the same according to an embodiment of the present invention.

Referring to FIG. 11, a first group zone 1110 having 3×3 zones and a second group zone 1130 having 3×3 zones, both of which are included in the entire zone 600, are shown.

The average densities of the first group zone 1110 and the second group zone 1130 are equally 3.0.

The processor 260 may calculate the lower average densities respectively corresponding to lower group zones configuring the first group zone 1110 and the lower average densities respectively corresponding to the lower group zones configuring the second group zone 1130, in order to determine the priorities of the first group zone 1110 and the second group zone 1130.

Each lower average density may be the average density of 2×2 zones.

The processor 260 may compare the average (2.2875) of the lower average densities of the lower group zones configuring the first group zone 1110 with the average (3.438) of the lower average densities of the lower group zones configuring the second group zone 1130.

Since the average (3.438) of the lower average densities of the lower group zones configuring the second group zone 1130 is greater than the average (2.2875) of the lower average densities of the lower group zones configuring the first group zone 1110, the processor 260 may give higher priority to the second group zone 1130 than the first group zone 1110.

According to the embodiment of the present invention, when the average densities of the group zones are the same, the priority of the group zone may be determined based on the average density of the lower group zones of each group zone.

Accordingly, it is possible to more clearly determine the movement position of the robot for providing a guidance service.

Meanwhile, although the steps of FIG. 5 and the steps of FIG. 10 are performed by the first AI server 200 in the above-described embodiments, these steps may be performed by any one 100a of the plurality of robots.

Any one robot 100a may be a master robot capable of controlling the other robots and the master robot may be a predetermined robot.

Figures 12, 13:
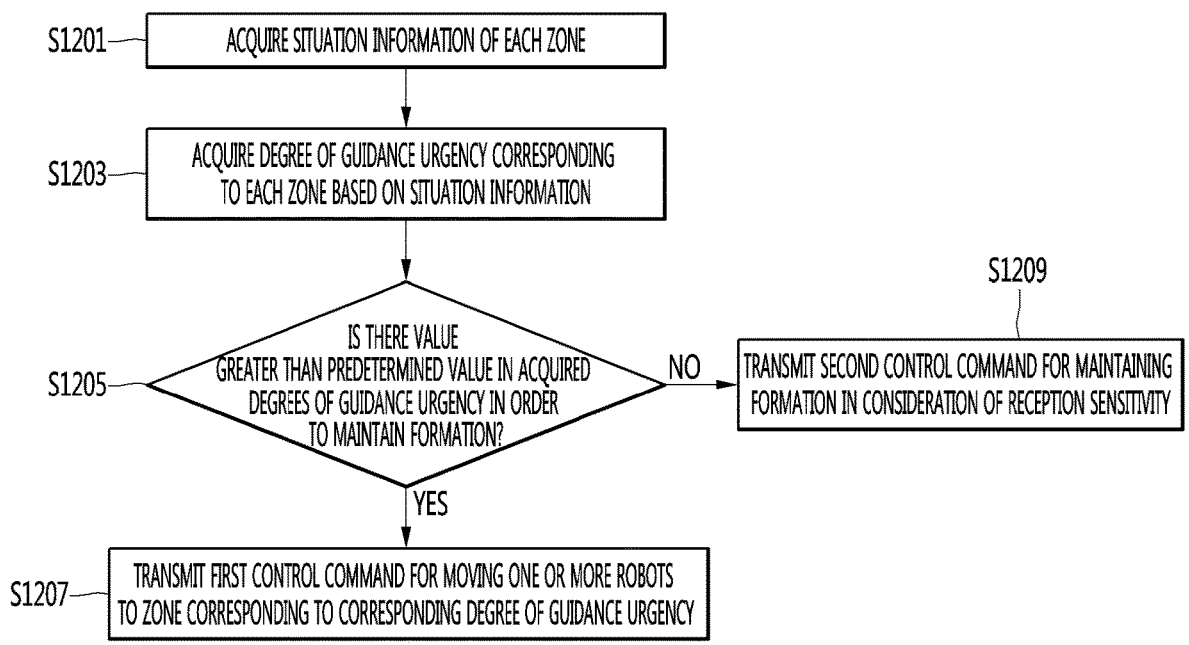
FIG. 12 is a flowchart illustrating a method of operating an AI server for controlling a plurality of robots using artificial intelligence according to another embodiment of the present invention.
FIG. 13 is a view illustrating a process of determining a degree of guidance urgency of each zone based on situation information according to an embodiment of the present invention.

FIG. 12 is a flowchart illustrating a method of operating an AI server for controlling a plurality of robots using artificial intelligence according to another embodiment of the present invention.

The AI server 200 may be a control system for controlling a plurality of robots disposed in an airport or a building.

Referring to FIG. 12, the processor 260 of the AI server 200 acquires situation information of each of a plurality of zones (S1201).

In one embodiment, the situation information of each zone may include a density of each zone and user situation information of each zone. Here, the density may indicate the number of users located in each zone.

Here, the zone may have any one of a 1×1, 2×2, 3×3, 4×4 or 5×5 form.

The processor 260 may receive user information from the plurality of robots disposed in the plurality of zones through the communication unit 210 and calculate the density of each zone based on the received user information.

For the method of calculating the density, refer to the description of FIGS. 5 to 9.

The user situation information may include a situation in which a plurality of users waits to receive guidance services from a robot 100a in a zone.

The robot 100a or the camera disposed in the zone may capture the image of the zone and transmit the captured image to the AI server 200.

The AI server 200 may determine a user waiting situation indicating whether a plurality of users waits to receive the guidance services of the robot 100a from the received image.

The AI server 200 may determine whether a current situation is a user waiting situation from the image using an image recognition model.

The image recognition model may be an artificial neural network based model learned using a deep learning algorithm or a machine learning algorithm.

The image recognition model may be stored in a model storage unit 231 of the memory 230.

The image recognition model may be supervised-learned a training data set including image data and a waiting state labeled therewith.

The image recognition model may be a model for inferring whether the current situation is a user waiting situation from actual image data.

The image recognition model may infer the number of users waiting to receive the guidance services, when the current situation is a user waiting situation.

The image recognition model may recognize the faces of the waiting users and determine the number of waiting users, when the current situation is a user waiting situation.

The processor 260 acquires a plurality of degrees of guidance urgency respectively corresponding to the plurality of zones based on the situation information (S1203).

In one embodiment, the degree of guidance urgency may be a value indicating a degree of need for the robot to move to a corresponding zone.

In one embodiment, the processor 260 may determine the degree of guidance urgency of each zone based on the density of each zone and the waiting situation.

In another embodiment, the processor 260 may determine the degree of guidance urgency of each zone based on the density of each zone and the number of persons waiting to receive the guidance services.

FIG. 13 is a view illustrating a process of determining a degree of guidance urgency of each zone based on situation information according to an embodiment of the present invention.

FIG. 13 is a view illustrating a process of determining a degree of guidance urgency of each zone based on the situation information acquired in each of four zones.

Different weights may be given to the density and the number of persons waiting to receive the guidance services.

For example, a first weight may be given to the density and a second weight may be given to the number of waiting persons.

The first weight may be less than the second weight.

That is, a weight of 1 may be given to the density and a weight of 4 may be given to the number of waiting persons, because handling of the users waiting to receive the guidance services is more urgent than handling of the density.

The processor 260 may calculate the degree of guidance urgency of each zone according to the given first and second weights.

Referring to FIG. 13, the density of the first zone is 5 and the number of persons waiting to receive the guidance services in front of the robot 100a is 0.

The processor 260 may calculate the degree of guidance urgency of the first zone as 5.

The density of the second zone is 3 and the number of waiting persons is 2. The processor 260 may calculate the degree of guidance urgency of the second zone as 11.

The density of the third zone is 1 and the number of waiting persons is 1. The processor 260 may calculate the degree of guidance urgency of the third zone as 5.

The density of the fourth zone is 2 and the number of waiting persons is 0. The processor 260 may calculate the degree of guidance urgency of the fourth zone as 2.

FIG. 12 will be described again.

The processor 260 determines whether there is a value greater than a predetermined value for maintaining formation in the plurality of acquired degrees of guidance urgency (S1205).

In one embodiment, the value predetermined to maintain formation may be a value set to provide the guidance service in the zone allocated to each of the plurality of robots.

That is, the predetermined value may be a minimum value set such that each robot does not leave the zone allocated thereto.

For example, the predetermined value may be 6.

Referring to FIG. 13, when the predetermined value is 6, the processor 260 may determine that the second zone having a degree of guidance urgency greater than 6 has a more urgent guidance service than the other zones.

When there is a value greater than the predetermined degree of guidance urgency for maintaining formation in the plurality of acquired degrees of guidance urgency, the processor 260 transmits a first control command for moving one or more robots to the zone corresponding to the corresponding degree of guidance urgency through the communication unit 210 (S1207).

The processor 260 may transmit a control command for moving the robot disposed in a zone having a degree of guidance urgency less than the corresponding degree of guidance urgency to the zone corresponding to the corresponding degree of guidance urgency.

This will be described with reference to FIG. 13.

The processor 260 may determine the second zone having the degree of guidance urgency greater than the predetermined value of 6 as a zone having higher priority.

The processor 260 may transmit a control command for moving to the second zone to one or more robots among the robots disposed in the first, third and fourth zones having the degree of guidance urgency less than the predetermined value.

In one embodiment, the processor 260 may transmit, to the robot disposed in the fourth zone, a control command for moving the robot disposed in the fourth zone having a smallest degree of guidance urgency to the second zone.

The robot disposed in the fourth zone may move to the second zone according to the control command received from the AI server 200. The moved robots may provide the guidance service to the user waiting to receive.

When there is no value greater than the predetermined degree of guidance urgency for maintaining formation in the plurality of acquired degrees of guidance urgency, the processor 260 transmits a second control command for maintaining formation to the plurality of robots through the communication unit 210 in consideration of reception sensitivity (S1209).

A plurality of AI sub-servers may be disposed at fixed positions in each of the plurality of zones. Each of the plurality of AI sub-servers may include all the components shown in FIG. 2.

The AI server 200 may control the plurality of AI sub-servers. For example, in order to transmit a control command to any one robot, the AI server 200 may transmit a control command to an AI sub-server for managing the robot. In this case, the AI sub-server may transmit the control command received from the AI server 200 to the robot managed thereby.

The reception sensitivity may mean the strength of a signal received by each of the plurality of AI sub-servers managed by the AI server 200 from the robot 100a disposed in each zone.

The reception sensitivity may mean the strength of a signal received by any one robot from another robot.

The second control command for maintaining formation may be a command for controlling movement of the robot such that each robot does not leave the zone corresponding thereto.

Hereinafter, the embodiment of FIG. 12 will be described in greater detail.

Figure 14:
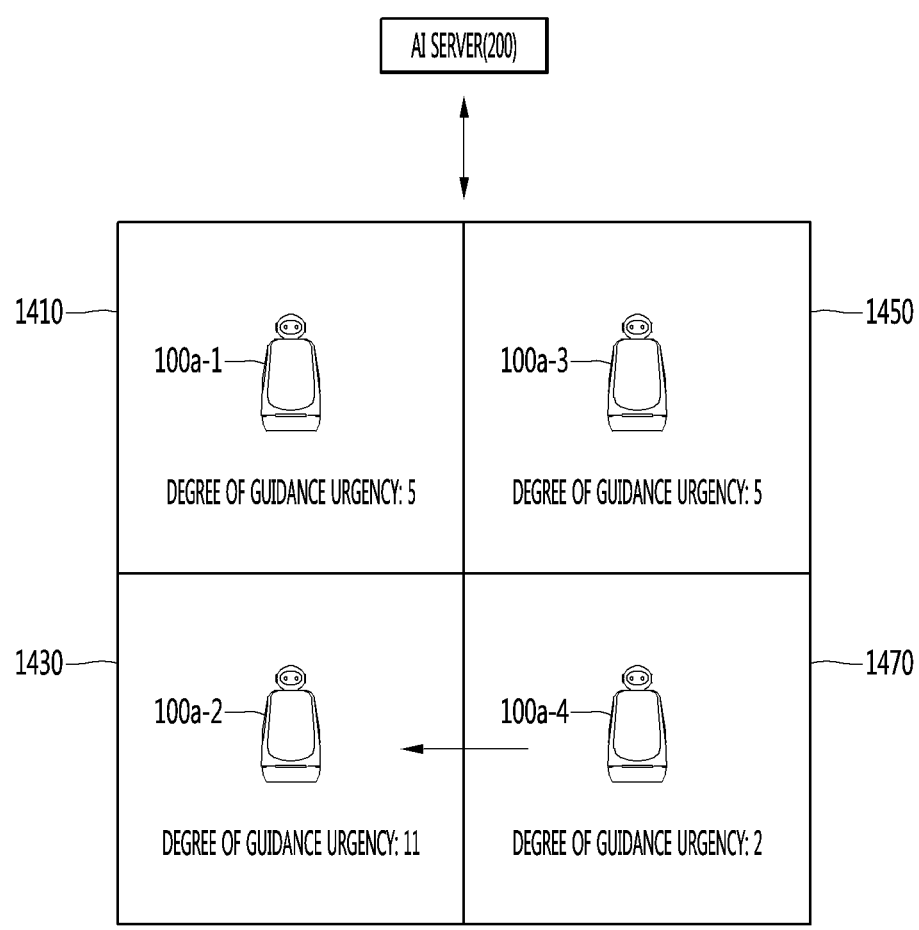
FIGS. 14 and 15 are views illustrating a process of controlling movement of a robot based on situation information of each zone according to an embodiment of the present invention.
Figure 15:
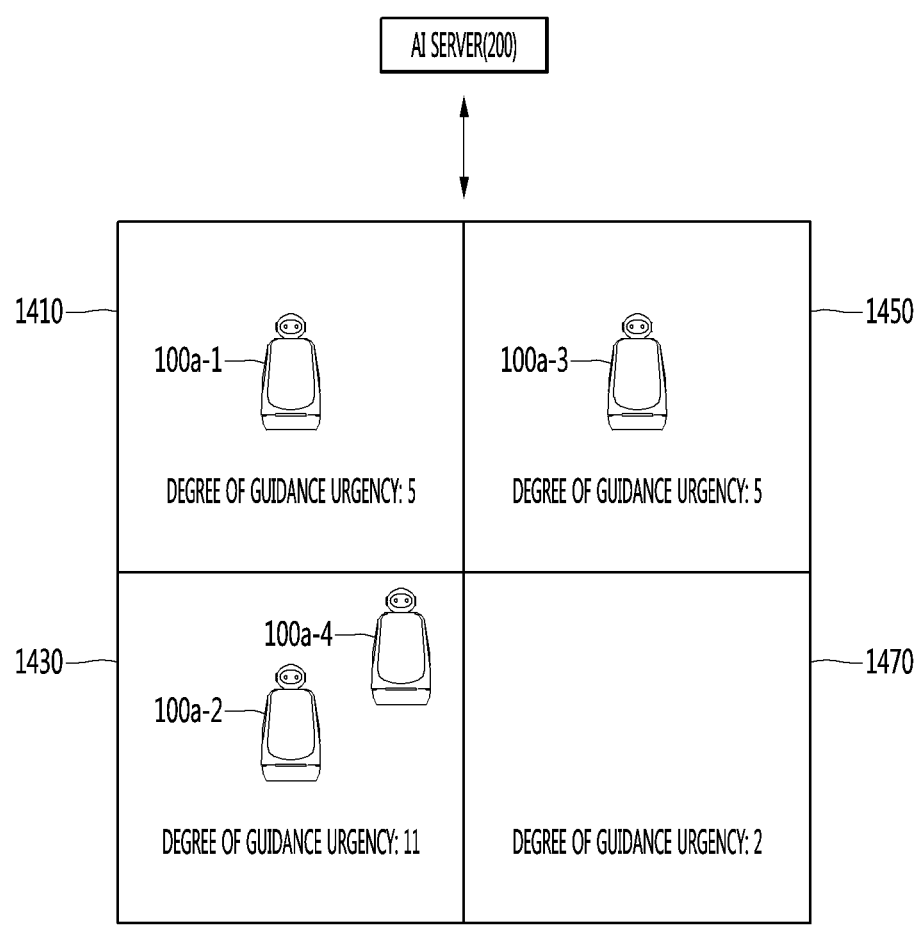

FIGS. 14 and 15 are views illustrating a process of controlling movement of a robot based on situation information of each zone according to an embodiment of the present invention.

In FIGS. 14 and 15, assume that there are four zones 1410 to 1470.

A first robot 100a-1 provides a guidance service in a first zone 1410, a second robot 100a-2 provides a guidance service in a second zone 1430, a third robot 100a-3 provides a guidance service in a third zone 1450, and a fourth robot 100a-4 provides a guidance service in a fourth zone 1470.

The AI server 200 may receive the captured image of the zone from each of the first to fourth robots 100a-1 to 100a-4.

The AI server 200 may acquire the situation information of each area from the received image using the image recognition model. The situation information may include the density of the zone and the number of persons wait to receive the guidance service.

The AI server 200 may calculate the degree of guidance urgency of each zone based on the situation information as in the embodiment of FIG. 13.

Since the degree of guidance urgency of the second zone 1430 is greater than the predetermined value of 6, the AI server 200 may determine the second zone 1430 as a zone having the most urgent guidance.

The AI server 200 may transmit, to the fourth robot 100a-4, a control command for moving the fourth robot 100a-4 disposed in the fourth zone 1470 having a smallest degree of guidance urgency to the second zone 1430.

As shown in FIG. 15, the fourth robot 100a-4 may leave the fourth zone 1470 and move to the second zone 1430 according to the control command received from the AI server 200.

The fourth robot 100a-4 moved to the second zone 1430 may provide the guidance service to the user waiting to receive the guidance service.

According to the embodiment of the present invention, since the robot is disposed in consideration of the situation of each zone, it is possible to more efficiently provide the guidance service.

Meanwhile, when the degree of guidance urgency of each zone is less than the predetermined value, the AI server 200 may maintain formation of the plurality of robots in consideration of reception sensitivity.

Figure 16:
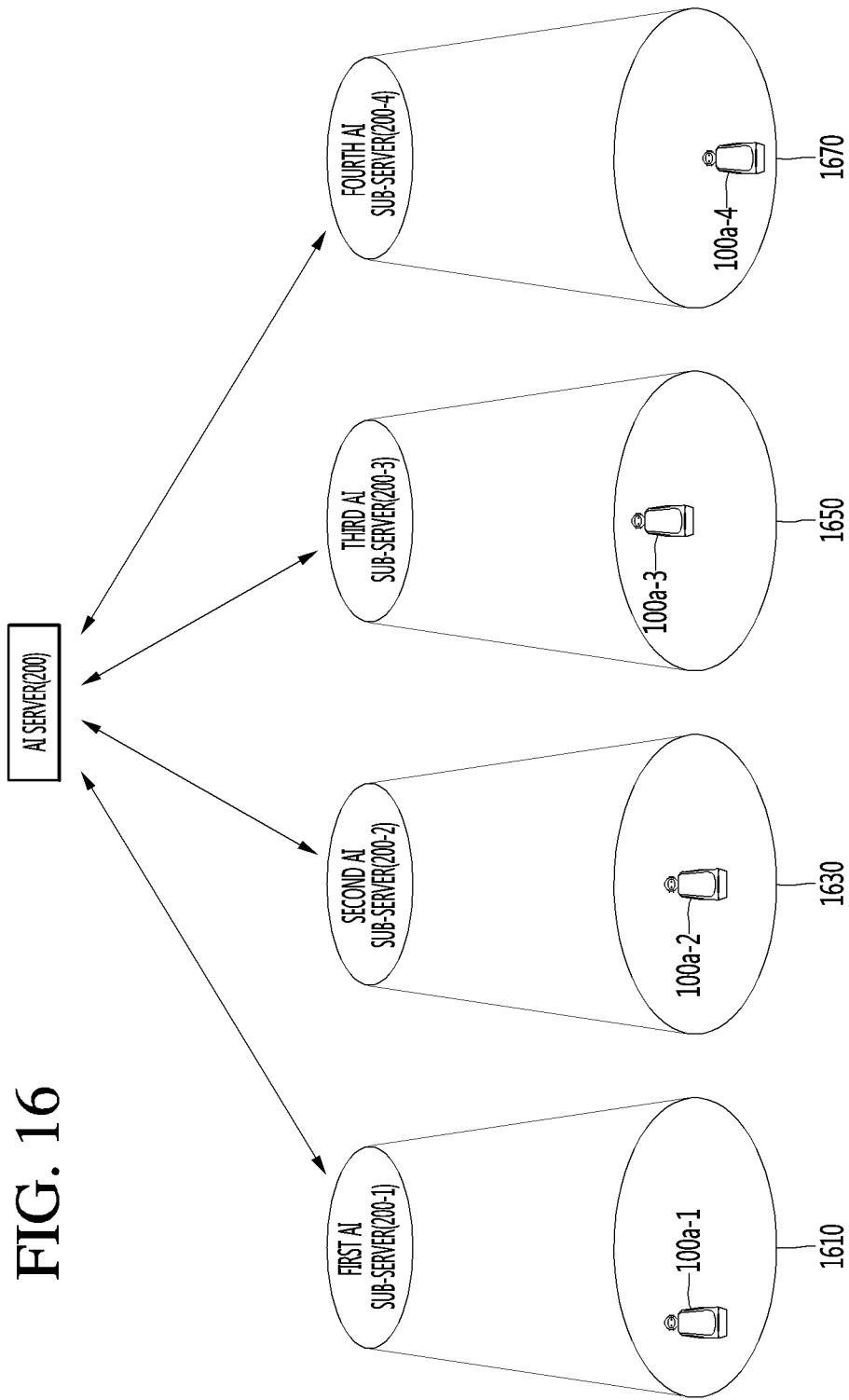
FIGS. 16 to 18 are views illustrating a process of maintaining formation of a plurality of robots in consideration of reception sensitivity according to an embodiment of the present invention.
Figure 17:
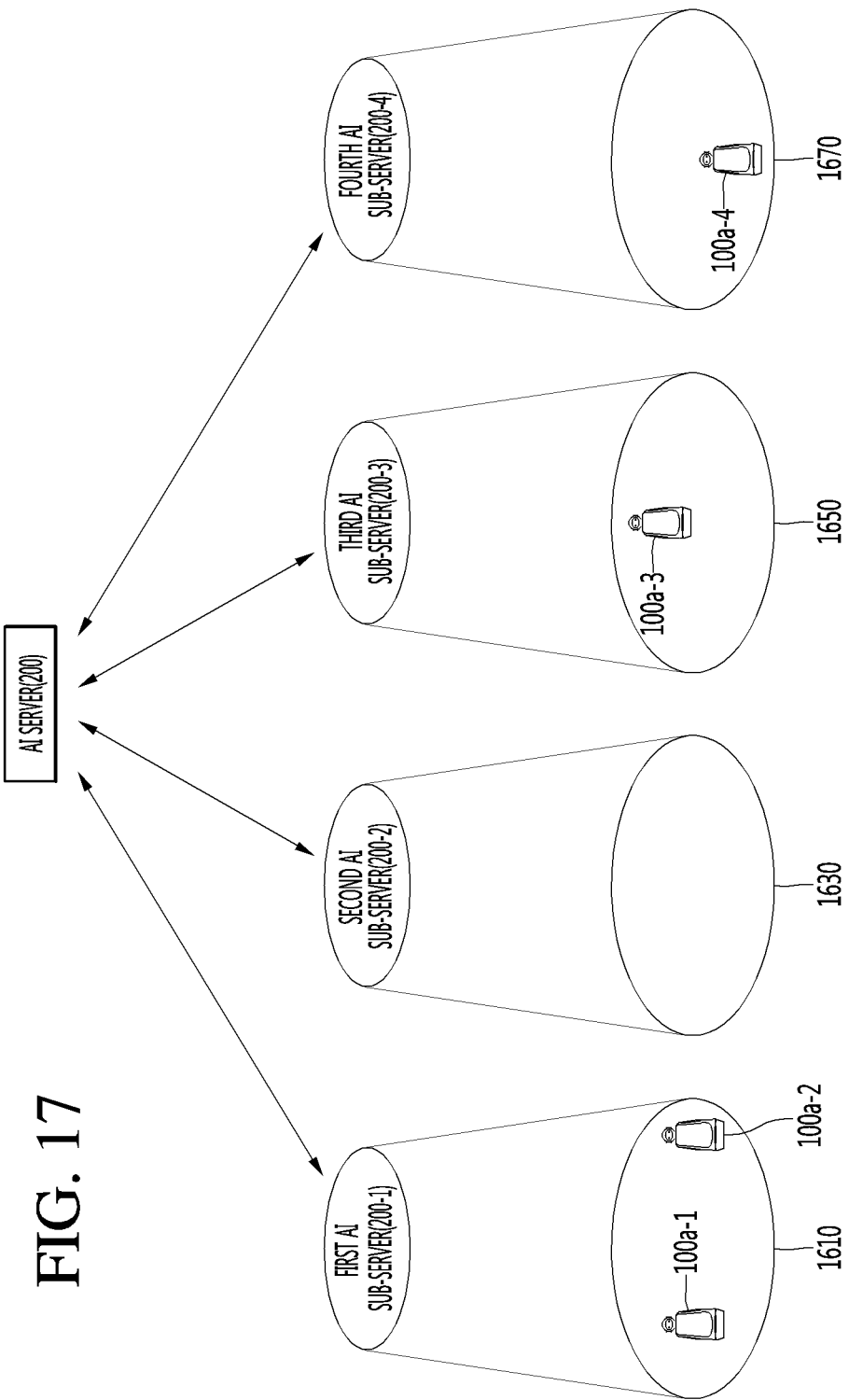
Figure 18:
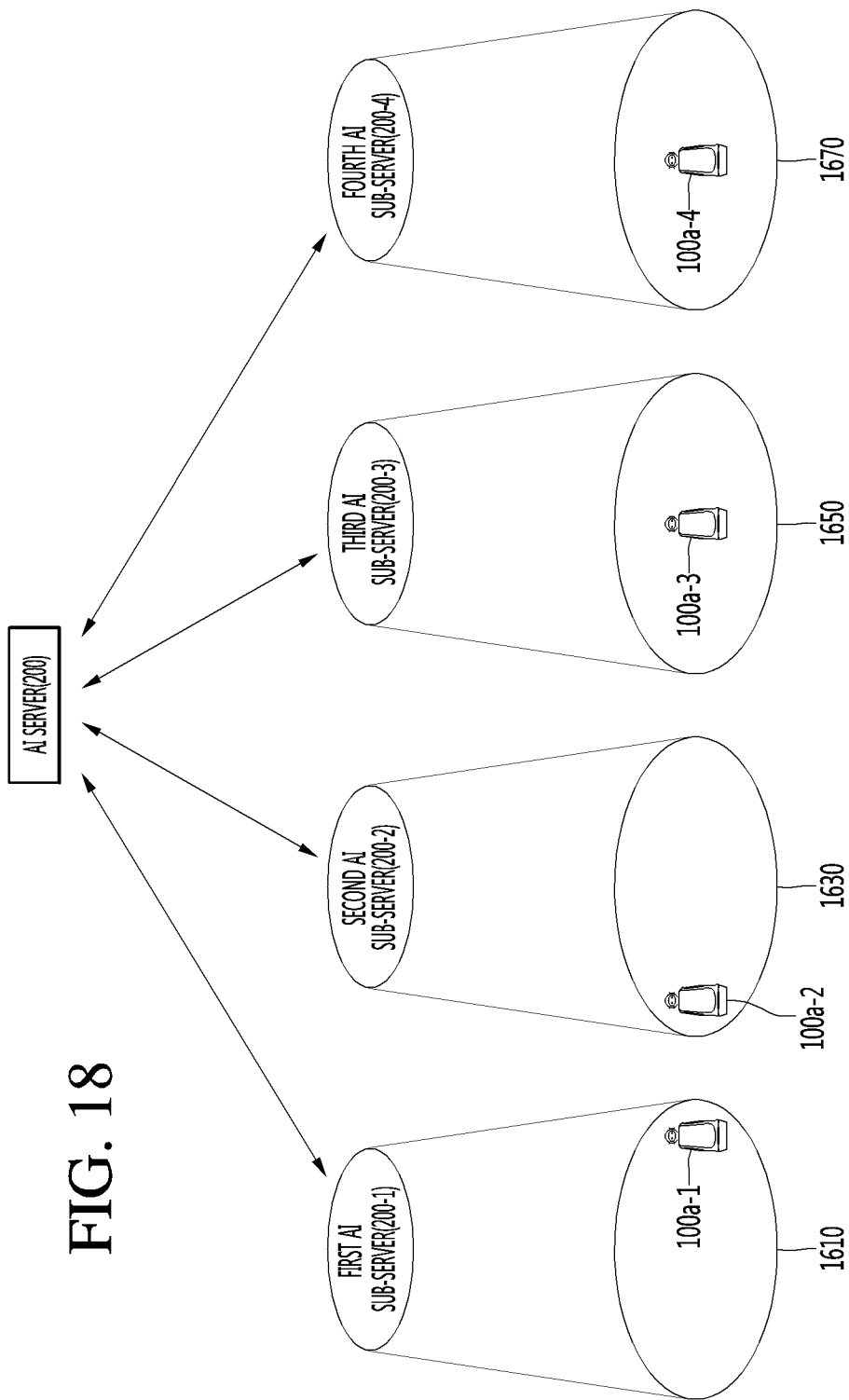

FIGS. 16 to 18 are views illustrating a process of maintaining formation of a plurality of robots in consideration of reception sensitivity according to an embodiment of the present invention.

In FIGS. 16 to 18, the plurality of AI sub-servers 200-1 to 200-4 may perform wireless communication with the AI server 200.

Each of the plurality of AI sub-servers 200-1 to 200-4 may receive the control command from the AI server 200 and transmit the received control command to the robots managed thereby.

Referring to FIG. 16, the first robot 100a-1 may be disposed in the first zone 1610 and the first AI sub-server 200-1 may control operation of the first robot 100a-1. The second robot 100a-2 may be disposed in the second zone 1630 and the second AI sub-server 200-2 may control operation of the second robot 100a-2. The third robot 100a-3 may be disposed in the third zone 1650 and the third AI sub-server 200-3 may control operation of the third robot 100a-3. The fourth robot 100a-4 may be disposed in the fourth zone 1670 and the fourth AI sub-server 200-4 may control operation of the fourth robot 100a-4.

Each AI sub-server may periodically transmit and receive a signal to and from the robot disposed in the zone managed thereby. The signal may be transmitted to measure reception sensitivity.

FIG. 17 may show a scenario which may occur when the second robot 100a-2 disposed in the second zone 1630 leaves the second zone 1630.

The second AI sub-server 200-2 may measure the reception sensitivity of the signal received from the second robot 100a-2.

The second AI sub-server 200-2 may transmit the measured reception sensitivity to the AI server 200.

When the received reception sensitivity is less than predetermined reception sensitivity, the processor 260 of the AI server 200 may determine that the second robot 100a-2 leaves the second zone 1630.

In this case, the processor 260 of the AI server 200 may transmit, to the second AI sub-server 200-2, a control command for returning the second robot 100a-2 to the second zone 1630.

The second AI sub-server 200-2 may transmit the control command received from the AI server 200 to the second robot 100a-2. Therefore, the second robot 100a-2 may move to the second zone 1630.

In another example, upon determining that the second robot 100a-2 leaves the second zone 1630, the processor 260 of the AI server 200 may transmit, to the plurality of AI sub-servers 200-1 to 200-4, the control command for returning the second robot 100a-2 to the second zone 1630, because it is not known to which zone the second robot 200a-2 moves.

In another example, the second AI sub-server 200-2 may compare the measured reception sensitivity with the predetermined reception sensitivity without transmitting the measured reception sensitivity to the AI server 200.

When the measured reception sensitivity is less than the predetermined reception sensitivity, the second AI sub-server 200-2 may transmit, to the second robot 100a-2, the control command for returning to the second robot 100a-2 to the second zone 1630.

Next, FIG. 18 will be described.

FIG. 18 shows an embodiment in which two robots located close to each other are detected and the distance between the two robots is maintained.

Referring to FIG. 17, the first robot 100a-1 and the second robot 100a-2 do not leave the respective zones. However, the first robot 100a-1 and the second robot 100a-2 are located close to each other.

Any one of the first robot 100a-1 or the second robot 100a-2 may measure the reception sensitivity of the signal transmitted and received to and from each other.

Any one of the first robot 100a-1 or the second robot 100a-2 may transmit a control command for increasing the distance between the two robots to the other robot, when the measured reception sensitivity is greater than the reference reception sensitivity. Therefore, the distance between the first robot 100a-1 and the second robot 100a-2 may increase.

According to the embodiment of the present invention, it is possible to stably maintain formation of the plurality of robots based on the reception sensitivity. Therefore, it is possible to prevent the plurality of robots from leaving from the respective zones and wandering.

According to the embodiment of the present invention, since robots are disposed in consideration of the situation of each zone, it is possible to efficiently provide guidance services.

Therefore, it is possible to improve satisfaction of users who receive guidance services.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the AI device.

What is claimed is:

1. An artificial intelligence server for controlling a plurality of robots using artificial intelligence, the artificial intelligence server comprising:
   a transceiver configured to receive a captured image of each of a plurality of zones;

a memory configured to store an image recognition model for recognizing users located in each zone and a waiting situation from an image, wherein the image recognition model is an artificial neural network based model supervised-learned through a deep learning algorithm or a machine learning algorithm; and a processor configured to:

acquire a number of users located in each zone and a number of persons in the waiting situation using the image recognition model, acquire situation information of each zone based on the received image, wherein the situation information includes a density of users of each zone and a number of persons waiting to receive guidance services in each zone, acquire degrees of guidance urgency respectively corresponding to the plurality of zones based on the acquired situation information of each zone, wherein the degrees of urgency of each zone are determined according to an assigned first weight to the density of users of each of the plurality of zones and an assigned second weight to the number of persons waiting to receive guidance services in each zone, determine whether there is a degree of guidance urgency greater than a predetermined value in the acquired degrees of guidance urgency, and, when there is a degree of guidance urgency greater than the predetermined value, transmit a first control command that causes one or more robots to move to a zone corresponding to the degree of guidance urgency.

2. The artificial intelligence server of claim 1, wherein the assigned first weight is less than the assigned second weight.

3. The artificial intelligence server of claim 2, wherein the processor is further configured to transmit the first control command to a robot disposed in a zone having a smallest degree of guidance urgency.

4. The artificial intelligence server of claim 1, wherein the processor is further configured to transmit, to the plurality of robots, a second control command that causes the one or more robots to move such that each robot does not leave a zone corresponding thereto, when there is no degree of guidance urgency greater than the predetermined value in the acquired degrees of guidance urgency.

5. A method of operating an artificial intelligence server for controlling a plurality of robots using artificial intelligence, the method comprising:

receiving a captured image of each of a plurality of zones;

storing an image recognition model for recognizing users located in each zone and a waiting situation from an image, wherein the image recognition model is an artificial neural network based model supervised-learned through a deep learning algorithm or a machine learning algorithm;

acquiring a number of users located in each zone and a number of persons in the waiting situation using the image recognition model, acquiring situation information of each zone based on the received images, wherein the situation information includes a density of users of each zone and a number of persons waiting to receive guidance services in each zone;

acquiring degrees of guidance urgency respectively corresponding to the plurality of zones based on the acquired situation information of each zone, wherein the degrees of urgency of each zone is determined according to an assigned first weight to the density of users of each of the plurality of zones and an assigned second weight to the number of persons waiting to receive guidance services in each zone;

determining whether there is a degree of guidance urgency greater than a predetermined value in the acquired degrees of guidance urgency; and when there is a degree of guidance urgency greater than the predetermined value, transmitting a first control command that causes one or more robots to move to a zone corresponding to the degree of guidance urgency.

6. The method of claim 5, wherein the assigned first weight is less than the assigned second weight.

7. The method of claim 6, wherein the transmitting includes transmitting the first control command to a robot disposed in a zone having a smallest degree of guidance urgency.

8. The method of claim 5, further transmitting, to the plurality of robots, a second control command that causes the one or more robots to move such that each robot does not leave a zone corresponding thereto, when there is no degree of guidance urgency greater than the predetermined value in the acquired degrees of guidance urgency.

* * * * *